United States Patent
Lee et al.

(10) Patent No.: US 6,542,625 B1
(45) Date of Patent: Apr. 1, 2003

(54) METHOD OF DETECTING A SPECIFIC OBJECT IN AN IMAGE SIGNAL

(75) Inventors: Jin Soo Lee, Seoul (KR); Hyeon Jun Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/478,495

(22) Filed: Jan. 6, 2000

(30) Foreign Application Priority Data

Jan. 8, 1999 (KR) .................................................. 99-252

(51) Int. Cl.[7] .................................................. G06K 9/00
(52) U.S. Cl. ........................ 382/118; 348/169; 382/165
(58) Field of Search ................................ 382/103, 117, 382/118; 351/200, 204; 348/77, 78, 169, 526; 340/5.53, 5.83; 356/71; 396/18, 51

(56) References Cited

U.S. PATENT DOCUMENTS

| | | | | | |
|---|---|---|---|---|---|
| 5,164,992 A | * | 11/1992 | Turk et al. | ................... | 382/118 |
| 5,828,769 A | * | 10/1998 | Burns | .......................... | 382/118 |
| 6,026,188 A | * | 4/2000 | Dionysian | ................... | 382/216 |
| 6,101,264 A | * | 8/2000 | Wagner et al. | ............... | 382/115 |
| 6,181,805 B1 | * | 1/2001 | Koike et al. | ................ | 382/117 |
| 6,184,926 B1 | * | 4/2001 | Khosravi et al. | ........... | 348/239 |
| 6,256,046 B1 | * | 7/2001 | Waters et al. | ............... | 345/473 |

* cited by examiner

*Primary Examiner*—Samir Ahmed
(74) *Attorney, Agent, or Firm*—Fleshner & Kim, LLP

(57) ABSTRACT

A method of detecting a specific object in an image signal is disclosed. In the present invention, the final object region can be determined by selecting one of two object regions detected by different methods or by combining the two object regions with assigned weights.

15 Claims, 4 Drawing Sheets

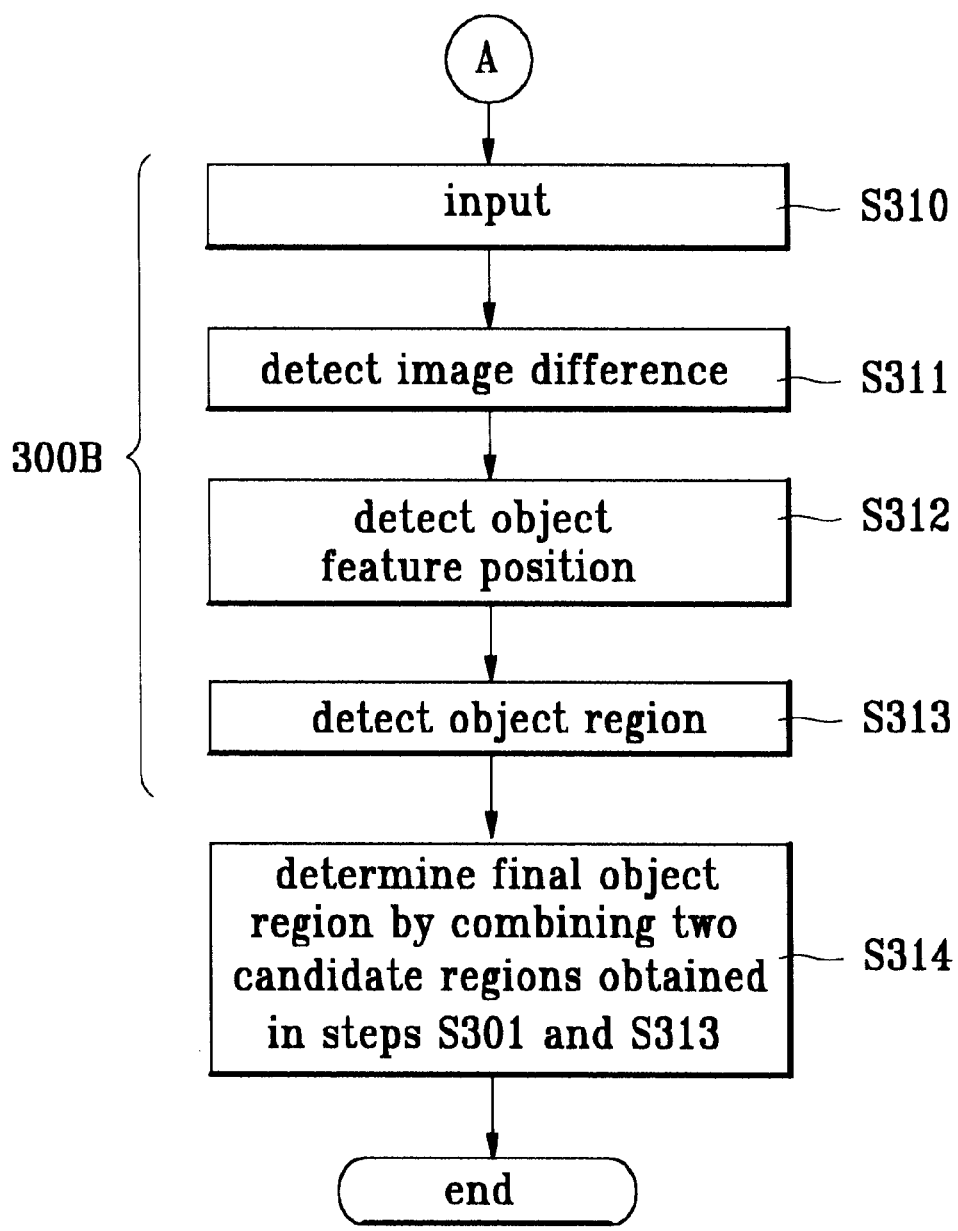

METHOD OF DETECTING A SPECIFIC OBJECT IN AN IMAGE SIGNAL

BACKGROUND OF THE INVENTION

1. Field of the Invention

The present invention relates to a method of detecting a specified object in an image signal and more particularly to a detecting a specific object in a moving picture file.

2. Background of the Related Art

Recently, technology for digital image signal processing has been greatly developed and has been applied in various fields. For example, the digital image signal processing technology may be used in a search system for automatically editing only the face of a specific character in a moving picture file of a movie or drama, or in a security system for permitting access to only persona registered in the system. The performance of such systems basically depend on the accuracy and speed of the detecting a desired object. Accordingly, various methods of detecting a desired object have been proposed in the related art.

In "Pedestrian Detection Using Wavelet Templates", CVPR97, June 17–19, MIT, a face is detected by using predetermined face templates of a plurality of characters, templates for each character ranging from a minimum size to a maximum size. When the image signal is input to the system, the frames are scanned and matched with the face templates of various size and character to detect the face. As a result, a great number of template matching may be required, thereby increasing the processing time for detecting a desired object.

In "Automatic Extraction of Face from Color Reversal Film using Statistical Multistep Technique", ACCV '95 Second Asian Conference on Computer Vision, December 5–8, a method of detecting the face region of a character in a still image has been proposed. According to this face detecting method, the values expressed in the RGB (red, green, blue) color space are converted to the HSV (hue, saturation, value) color space, and the pixels representing a skin color are detected. Thereafter, segmentation of the detected skin color region is performed using an edge detection, hole filling, and gap filling operation. Thus, a final face region is detected by identifying the face region of a desired character using patterns prepared for estimating the detected region.

However, the relative accuracy of face detection is lower in comparison to other face detection methods because a still image is used which requires less information than the moving image. Also, this method utilizes only skin color information in detecting the face region, but such skin color information may changes according to the ethnic origin and circumstances such as the illumination, background, or makeup state of the character. Moreover, since the method requires the conversion from the RGB to the HSV color space, more processing time is required in detecting the face region.

Other detection methods include automatically detecting the face region of a character if the character moves on a screen of a video camera and then identifying the character if the detected face has been registered. According to this type of face detection, the whole movement of a character is detected using an image difference, and the face of the character is identified using the nervous system. Movements caught by the image difference may include movements of parts such as the body, arms or legs rather than the face, or noises belonging to the background. Thus, accuracy may not be high in detecting the face region from the image which moves as a whole. Also, in case of fast movement of a character, a significant time would be required to detect the face region.

SUMMARY OF THE INVENTION

Accordingly, an object of the present invention is to solve at least the problems and disadvantages of the related art.

An object of the present invention is to provide a method of detecting a specific object in an image signal, both efficiently and accurately.

Another object of the present invention is to provide a method of detecting the face of a character in an image signal, both efficiently and accurately.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the method for detecting a specific object in an image signal comprises detecting the specified object using an image difference obtained from two sequential input image frames of a first time difference; detecting a position of a particular feature of the specific object using a second image difference obtained from two sequential image frames of a second time difference which is relatively shorter than the first time difference, and detecting the specific object using a relationship between the specific object and the feature of the specific object; and determining the detection result as a final face region if one detection result of the specified object exists, and determining the final face region by combining the plurality of detection results if a plurality of detection results exist.

According to the present invention, the position of the face can be efficiently and accurately searched using the image differences with respect to movement of an object such as the face and movement of a particular feature of the object such as the eye or mouth. Accordingly, the method of the present invention can be applied to systems such as a moving picture search system or a security system for an effective detection of the face region.

BRIEF DESCRIPTION OF THE DRAWINGS

The invention will be described in detail with reference to the following drawings in which like reference numerals refer to like elements wherein:

FIGS. 3A and 3B show a flowchart of the detection method for an object according to the second embodiment of the present invention.

DETAILED DESCRIPTION OF THE PREFERRED EMBODIMENT

Reference will now be made in detail to the preferred embodiment of the present invention, examples of which are illustrated in the accompanying drawings. Although the present invention may be utilized to detect any specific object, a human face will be used as the specific object for purposes of explanation.

Accordingly, assuming that the object to detect is a face, a movement of the face and a movement of a feature of the face such as the eye or mouth may be identified by comparing two image frames. Particularly, a movement speed of the eye or mouth would be much higher than that of the body or face. Therefore, in the present invention, a moving element is detected using the difference between two image frames in view of the above-described movement characteristics of elements in the moving picture.

For example, the time difference between two image frames used to obtain a movement of the eye can be defined as follows.

If movement speed of eye
=n pixels/second at maximum, and
=m pixels/second at minimum;
then, the time difference ($\Delta t$) between two frames
1/m second.

Figure 1:
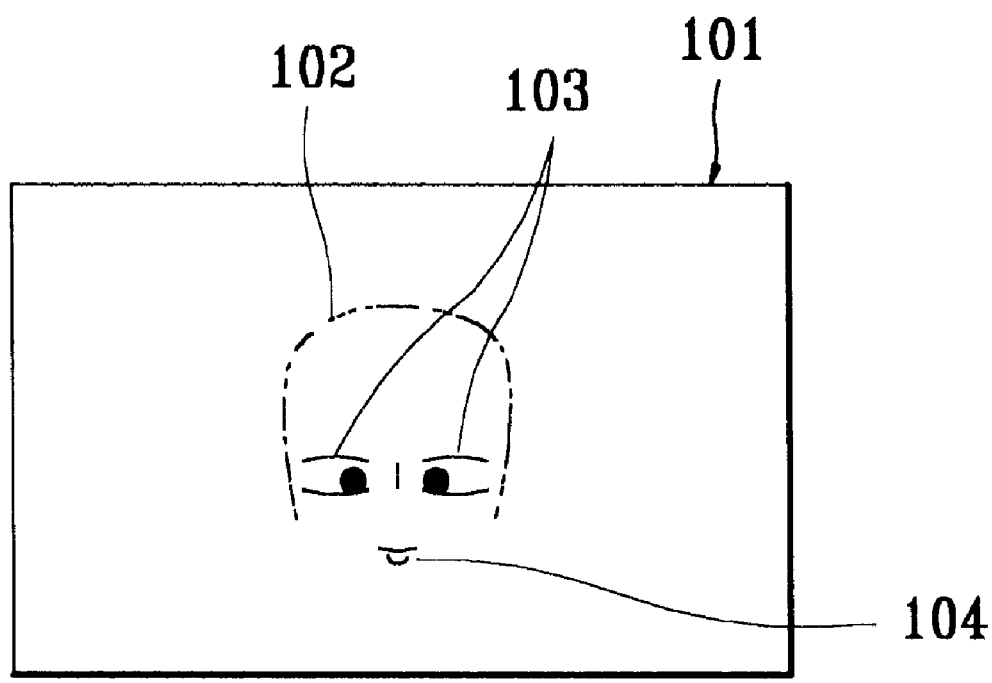
FIG. 1 illustrates an image difference between two frames of relatively small time difference in accordance with the present invention.

FIG. 1 is an image difference between two frames of relatively small time difference. The image difference 101 is also an image which includes a difference due to a movement of the face 102, a difference due to a movement of the eye 103, and a difference due to a movement of the mouth 104. If the position of the eye or mouth is identified utilizing the image differences 103 and 104 due to the movement of the eye or mouth, the region of certain distance which surrounds the eye or mouth can be determined as a candidate of a detected face.

However, since a movement of the eye or mouth may not appear in the moving picture signal at all times, the detecting process for such elements may require a long period of time. Accordingly, one way to reduce the detection processing time is to search for a movement of the eye or mouth within sections of image frames in which the face may appear.

Therefore, in the first embodiment of the present invention, candidates of face region in a moving picture file is initially detected using one of the detection methods in the related art. Subsequently, a movement of the eye or mouth is searched for within the sections where the face may appear, i.e. frames corresponding to the candidates of face regions, by utilizing an image difference of two frames. By combining a face detection method in the related art and a method utilizing a movement detection of a particular feature of the face, the present invention results in an accurate and relatively rapid detection of a face.

Figure 2:
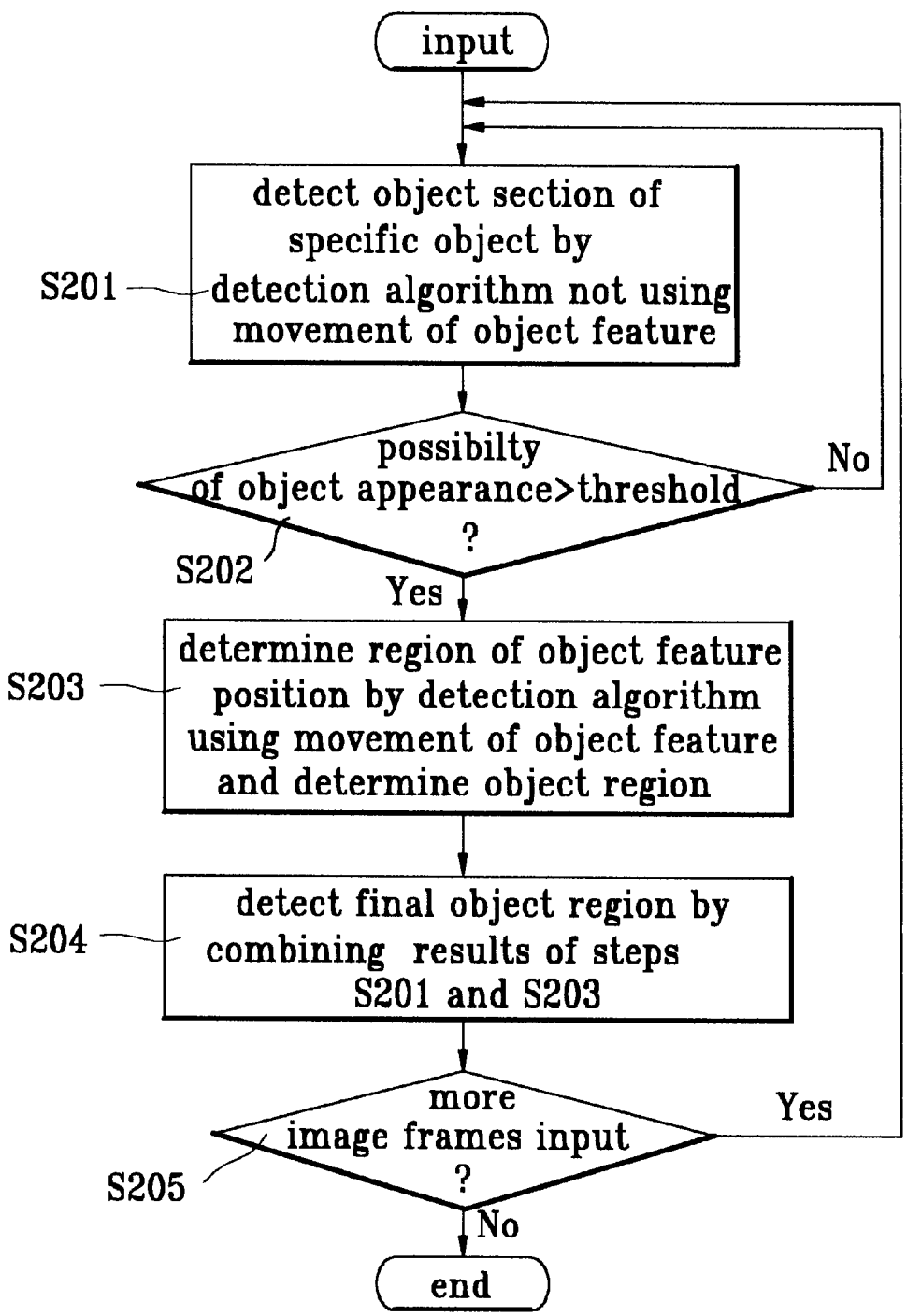
FIG. 2 is a flowchart of the detection method for an object according to the first embodiment of the present invention.

FIG. 2 shows the first embodiment of a method for detecting a face according to the present invention. The system initially detects sections within the input image frames in which a specific object such as a face may appear using a detection algorithm which does not use a movement of the object feature such as the eye or mouth (step S201). Here, the detection algorithm may employ one among the three detection methods described above, or any other detection method in the related art.

Thereafter, the system compares the result of the initial detection with a predetermined threshold, and if the result exceeds the threshold, the system judges that the specific object appears in a section (step S202). If the specific object is determined not to appear, the system returns to the step S201. Otherwise, system proceeds to search for the position of an object feature with respect to the specific object using two image frames. Thus, the system detects the position of an object feature by an algorithm which uses the movement of the object feature according to the present invention, and determines the object candidate region (step S203).

Assuming that the specific object is a face as shown in FIG. 1, the detection algorithm using the movement of the eye, i.e. the object feature, searches for an image difference with respect to the movement of the eye by comparing two image frames of relatively small time difference. Upon detecting a movement of the eye, the position of the eye can be determined and a face candidate region can then be determined using the position of the eye.

Combining the face candidate region and the result of the detected face using an algorithm in the related art, the system determines the final face region within a frame (step S204). Particularly, the system measures the reliabilities of the detected face regions by a template matching of the two results and determines the final face region by combining the two results using the measured reliabilities as weights. The system then judges if more image frames are input (step S205). If there are no more input image frames, the system terminates the detection process of the specific face. Otherwise, the system restarts step S201.

Accordingly, the system detects sections of image frames in which a specific object may appear using an algorithm in the related art, searches for a movement of the object feature with respect to the two image frames, and obtains the final face region by combining the two detection results. Thus, a more reliable detection of a specific object can be executed in relatively short period of time.

In an alternative embodiment, the system may perform step S203 prior to steps S201 and S202. In such case, the system searches for a movement of an object feature by an image difference with respect to two image frames of a small time difference. Subsequently, the system detects sections in which the object may appear within the image frames and determines whether there is a possibility that the specific object would appear in the section. The system then combines the two results as in the first embodiment.

Figure 3A:
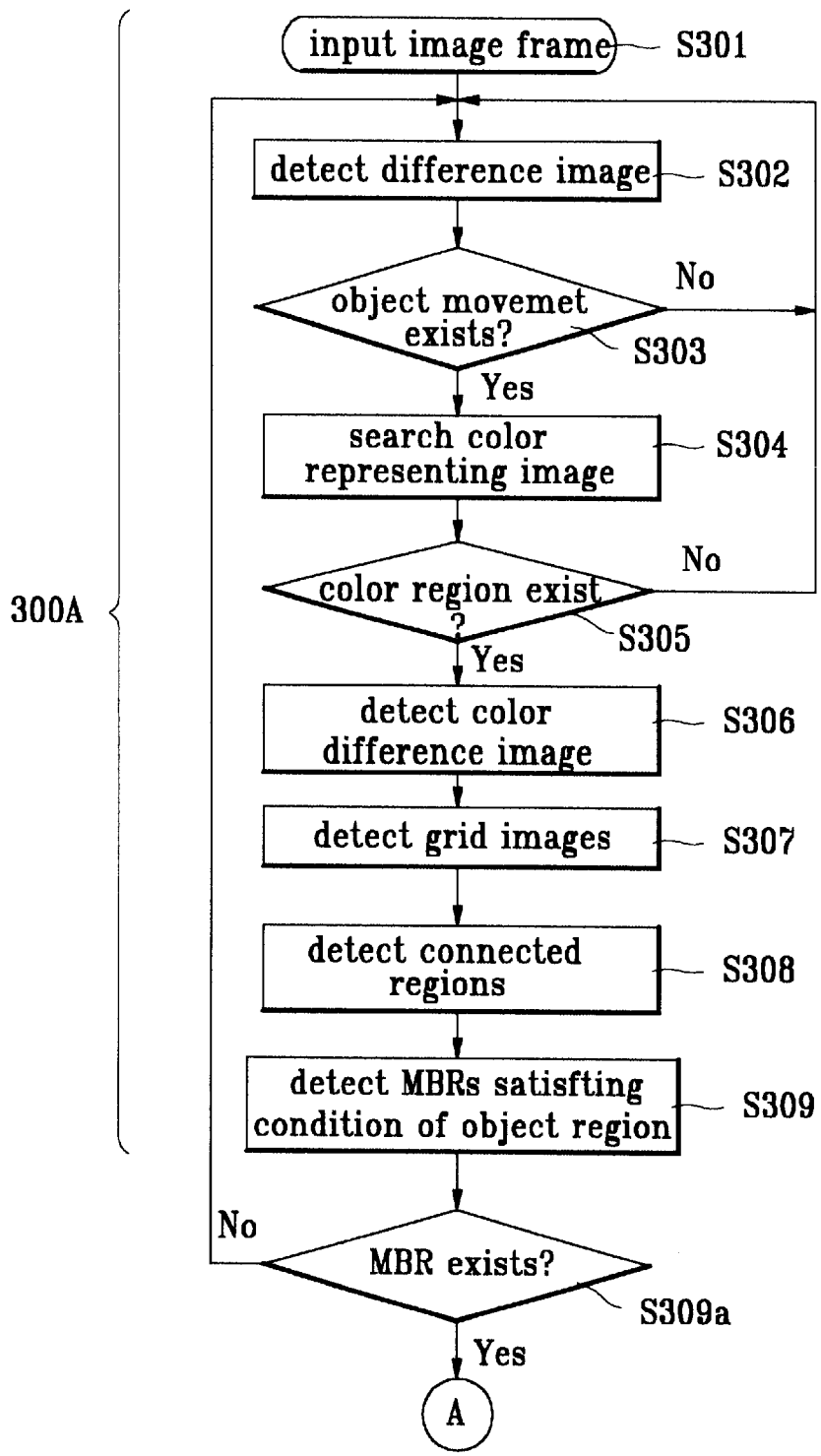

FIGS. 3A and 3B are flowcharts of a detection method for a face region according to another embodiment of the present invention. In this embodiment, a specific object is detected using an image difference between frames of relatively large time difference $\Delta t$ and an object feature is detected using an image difference between frames of relatively small time difference $\Delta t'$, where $\Delta t > \Delta t'$.

Referring to FIG. 3A, two image frames of time difference $\Delta t$ are input to the system (step S301). The system detects the image difference between the two input image frames to determine if a movement of the specific object exists (step S302). In the preferred embodiment, the image difference is obtained by detecting a difference between the gray value of a certain pixel in a frame at a time t and the gray value of a corresponding pixel of the same position in a frame at the time t'. If the obtained gray value is larger than a predetermined threshold value, the system determines the gray value at the corresponding pixel position of the image difference as "1," otherwise the system determines the gray value as "0". Thus, the image difference information is obtained.

The system then judges if a movement of the object exists using the obtained image difference (step S303). If an object movement does not exist, the system judges that the object does not appear, and returns to step S301 for the next frames. If an object movement exists, the system initially judges that the object does appear, and searches for a color representing a characteristic of the object (step S304). Accordingly, the system judges whether a region with such characteristic exists using the search result (step S305). For example, if the object is a human face, the system would judge if a face movement exists using the obtained image difference (step S303). If the face movement exists, the system, would judge that the face does appear, search for a skin color image (step S304), and determine whether a skin color region exists (step S305).

Particularly, if a movement was determined to exist but the characteristic color does not exist, the system judges that the object does not appear, and returns to step S301. If both a movement and the characteristic color of the object exists, the system judges that the object appears, and obtains a new color image difference by executing an AND operation with respect to the detected color region and the image difference (step S306). The new color difference image may also be obtained by executing the AND operation on the image difference and the pixels which satisfy the color condition in step S304. Thus, in the example, if the face movement was determined to exist but the skin color image does not exist, the system would judge that the face does not exist. However, if both the face movement and the skin color image exists, the system would judge that the face exists and obtain a new skin color difference image by executing an AND operation with respect to the skin color and the image difference (step S306).

Thereafter, the color difference image is made into grid images of a predetermined size (step S307). The system divides pixels having binary values into blocks, and if any block includes more than a predetermined number of pixels with the value of "1," the system determines the value of the corresponding block as "1." Otherwise, the system determines the value of the block as "0." By the above process, the system obtains the grid image information. The system then determines connected regions of a same value using the grid images (step S308). In other words, the system obtains connected regions of grids having values of "1" in eight directions, namely grids in the upper, lower, right, left and diagonal directions having the value of "1."

Subsequently, the system obtains minimum boundary rectangles (MBRs) including one connected region as obtained in step S308, and determines MBRs as a first object candidate region if a MBR satisfies a condition that the density of grids having the value of "1" is larger than a predetermined threshold value and a condition that the aspect ratio of the MBRs is within a predetermined range. Accordingly, using the detection algorithm which does not use the movement of the feature, the system can obtain object candidate regions if the MBRs meet the necessary conditions and if a movement of object and the color characteristic exist.

Therefore, the system judges if the obtained MBRs meet the condition of including a minimum density of grids having the value "1" and having a certain aspect ratio (step S309). The system judges if at least one MBR which satisfy the conditions exists (step S309a). If there are no MBR which satisfy the conditions, the system considers that the obtained MBRs does not contain the specific object and returns to step S301 to re-perform the object detection. However, if at least one MBR satisfies the conditions, the system performs the object detection using a movement of the feature.

In the example, the skin color difference image is made into grid images of a predetermined size having binary values (step S307). The system detects connected regions using the grid images (step S308), and obtains minimum boundary rectangles (MBRs) to judge if the obtained MBRs meet the condition of including a minimum density of grids having the value "1" and having a certain aspect ratio (step S309). If at least one MBR satisfies the conditions, the system performs the face detection using a movement of the eye or mouth.

FIG. 3B shows a detection method to determine the final face region using a movement of the feature according to the present invention. Referring to FIG. 3B, two image frames with a time difference Δt' are input to the system (step S310). The system detects the image difference between the two image frames to determine whether a movement of the feature exists (step S310). The system then detects the position of the feature (step S312). As in the detection of the object in FIG. 3A, a gray value of "1" or "0" is assigned for each pixel positions depending upon whether the gray value difference is larger than a predetermined threshold value.

For the example where the object is a face, the system would detect the image difference to determine whether a movement of a eye or mouth exists (step S311) and detect the position of the eye 103 or mouth 104 as shown in FIG. 1 (S312). Since the blinking speed of the eyes is fast, the position where a high density of pixels having gray values of "1" would be defined as the position of the eye. Similarly, since the movement of the mouth would be fast when speaking, the position where a high density of pixels having gray values of "1" would be defined as the position of the mouth.

Thus, the system determines an object candidate region using the obtained position of the feature (step S313). Particularly, the system uses an appropriate size of a predetermined template based upon both the detected position of the feature and the position of the feature in template. By adjusting and arranging the template size appropriately to match the detected position of the feature, a second object candidate region is obtained. Thereafter, the system determines the final object region by combining the object candidate regions obtained by the algorithm using a movement of the object in step S309 and the second object candidate region obtained by the algorithm using a movement of the feature in step S313 (step S314).

In the example, the system adjusts the template size using the detected position of the eyes and the position of the eyes in the template, and arranges the template to match the detected position of the eyes, such that the template region will be the face candidate region (step S313). Thereafter, the system determines the final face region by combining the face candidate regions obtained in step S309 and step S313 (step S314).

Particularly, the final object region is determined by template-matching the obtained face candidate regions and combining the results of the template matched regions as weighted values. Maintaining the example where a face is the specific object and assuming the feature is an eye, two face candidate regions are combined in steps S309 and S313 if the ratio of the intersection between the two face candidate regions to the second face candidate region obtained in step S312 is greater than a predetermined threshold value. If the ratio does not meet the above condition, there is a possibility that the obtained first and second face candidate regions are two different faces separately positioned from each other. As a result, the system may further perform template matching of each face candidate region, and if the resulting value of the template matching exceeds a predetermined threshold value, the system determines that the two face candidate regions are each final face regions.

In some cases, even if the time difference of the two image frames input at step S310 is shorter than the time difference of the image frames input at step S301, a movement of the eye with respect to the face may not actually appear. Thus, the face region detection using a movement of the eye in step S313 may fail. Accordingly, if the face region detection using a movement of the eye fails, the face candidate region detected without using a movement of the eye in step S309 may be determined as the final face region. Although the reliability of the detected face region may be less accurate if both procedures 300A and 300B are not utilized, the method as described above will be desirable when the face region detected from the area where the face appears is enough for the system to detect the face region. Accordingly, the procedures 300A and 300B may be performed by omitting steps S310~S314. Moreover, as described above, the procedure 300B is performed when a face is detected through the procedure 300A by step S309a. However, the detection procedures 300A and 300B may be performed in the reverse order, or may be performed simultaneously.

By using both a movement of the object to be detected such as a face and a movement of the object feature such as an eye, the detection method according to the present invention can detect the object more accurately and efficiently in comparison to the existing face region detection methods in the related art. Also, the present invention can determine a final face object region by combining a face region detected without using a movement of the feature and a face region detected using movement of the feature, with assigned weights.

Therefore, if the present object detecting method according to the present invention is applied to a moving picture search system or a security system using the face recognition, the detection object can be more accurately and efficiently detected in comparison to the existing detection methods. Furthermore, the present invention can be applied to fields which require an on-line face region detection through video cameras to obtain the same effect.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of detecting a specific object in an image signal comprising:
   (a) detecting a first image difference between a first two frames having a time difference of Δt to obtain a first candidate region of the specific object;
   (b) detecting a second image difference between a second two frames having a time difference of Δt' to obtain a second candidate region of the specific object, where Δt>Δt'; and
   (c) determining a final region of the specific object utilizing the first candidate region and the second candidate region.

2. A method of claim 1, wherein in (a) detecting the first image difference comprises:
   detecting a difference between a gray value of a certain pixel in an image frame at time t and a gray value of a corresponding pixel of the same position in an image frame at time t'; and
   assigning a value of "1" to a gray value of a pixel in the first image difference if the detected difference between the gray values is larger than a predetermined threshold value.

3. A method of claim 1, wherein (a) further comprises:
   determining whether a movement of the specific object exists based upon the first image difference;
   searching for a color region representing a characteristic of the specific object if the movement of the specific object exists;
   obtaining a color difference image if the color region exists by executing an AND operation with respect to the color region and the first image difference; and
   detecting MBRs using the color difference image and determining MBRs which satisfies a predetermined condition as the first candidate region.

4. A method of claim 3, wherein detecting MBRs comprises:
   dividing the color difference image into grid images of a predetermined size wherein if more than a predetermined number of pixels within a grid image have values of "1," the corresponding grid is assigned a value of "1;"
   determining connected regions of grid images having values of "1;" and
   obtaining MBRs wherein each MBR includes a connected region, and determining MBRs as a first object candidate region if a MBR satisfies a condition that a density of grids having the value of "1" is larger than a predetermined threshold value and a condition that the aspect ratio of the MBR is within a predetermined range.

5. A method of claim 1, wherein (b) further comprises:
   determining whether a movement of an object feature exists based upon the second image difference;
   detecting a position of an object feature if the movement of an object feature exists; and
   determining a region of certain distance which surrounds an object feature as the second candidate region.

6. A method of claim 5, wherein detecting the second image difference comprises:
   detecting a difference between a gray value of a certain pixel in an image frame at time t and a gray value of a corresponding pixel of the same position in an image frame at time t'; and
   assigning a value of "1" to a gray value of a pixel in the first image difference if the detected difference between the gray values is larger than a predetermined threshold value.

7. A method of claim 6, wherein detecting the position of an object feature comprises determining a position where a high density of pixels having gray values of "1" as the position of an object feature.

8. A method of claim 5, wherein determining the second candidate region comprises adjusting and arranging a template size appropriately to match a detected position of an object feature, and determining the region of the template as the second candidate region.

9. A method of claim 1, wherein in (c), determining the final region comprises:
   template-matching the first and second candidate regions; and
   combining the first and second candidate regions to obtain a final region if a ratio of an intersection of the template matched candidate regions to the second candidate region obtained is greater than a predetermined threshold value.

10. A method of claim 9, wherein if said ratio is not greater than the predetermined threshold value, performing a separate template matching for each of the first and second candidate regions, and determining one or both as final face regions if a template matched result exceeds the predetermined threshold value.

11. A method of claim 1, wherein in (c), determining the first candidate region as the final region if a second candidate region cannot be obtained.

12. A method of claim 1, wherein (a) is performed prior to (b) and (b) is performed for a second two frames between the first two frames.

13. A method of claim 1, wherein (a) and (b) are simultaneously performed.

14. A method of claim 1, wherein (a) further comprises:
- determining whether a movement of the specific object exists based upon the first image difference;
- searching for a color region representing a characteristic of the specific object if the movement of the specific object exists;
- obtaining a color difference image if the color region exists by executing an AND operation with respect to the color region and the first image difference;
- detecting MBRs using the color difference image and determining MBRs which satisfies a predetermined condition as the first candidate region; and wherein (b) further comprises:
- determining whether a movement of an object feature exists based upon the second image difference;
- detecting a position of an object feature if the movement of an object feature exists; and
- determining a region of certain distance which surrounds an object feature as the second candidate region.

15. A method of claim 14, wherein the specific object is a face and the object feature is an eye or a mouth.

* * * * *